United States Patent [19]
Michel et al.

[11] 3,817,383
[45] June 18, 1974

[54] APPARATUS FOR REMOVING PARTICULATE MATTER

[76] Inventors: Bernard Michel, 739 Des Vignes St., St. Foy, Quebec; Arthur Allison Delaney, 625 Milton St., Montreal, Quebec, both of Canada

[22] Filed: July 26, 1972

[21] Appl. No.: 275,145

[52] U.S. Cl................. 210/170, 210/305, 210/538, 210/DIG. 21
[51] Int. Cl............................................. E02b 15/02
[58] Field of Search............ 61/1, 2; 210/65, 74, 83, 210/84, 170, 259, DIG. 21, 305, 538; 209/18, 155–157, 162, 202, 488

[56] References Cited
UNITED STATES PATENTS

| | | | |
|---|---|---|---|
| 2,013,105 | 9/1935 | MacKillican | 209/155 |
| 2,590,756 | 3/1952 | Colin et al. | 209/156 X |
| 2,728,457 | 12/1955 | Clarke | 210/74 X |
| 3,419,145 | 12/1968 | DeCelis | 210/84 |

Primary Examiner—John Adee
Assistant Examiner—Robert H. Spitzer
Attorney, Agent, or Firm—Ian Fincham

[57] ABSTRACT

A device for removal of particulate and other solid matter or suspended material from a moving stream of water and which provides for the separation and diverting of a relatively uncontaminated strata from the stream of water. The device is either partially or totally submergible in water and has a passageway which initially narrows in at least one region in the direction of movement of the water and widens in a plane perpendicular thereto in a subsequent region in the direction of movement of the water. The shape of the passageway generates a stream velocity which permits formation of an upper strata carrying flotatable particulate material, and a lower strata which contains and carries other settable particulate matter and an intermediate strata which is relatively uncontaminated with these particulate matters. A splitter which projects into the stream separates the upper and lower strata permitting discharge thereof and diversion of the center or intermediate strata to a site of utilization.

12 Claims, 8 Drawing Figures

APPARATUS FOR REMOVING PARTICULATE MATTER

This invention relates in general to certain new and useful improvements in the removal of particulate matter from a liquid, and more particularly, to the removal of particulate matter from a moving stream of water with recovery of a relatively uncontaminated strata in this stream of water.

This invention constitutes an improvement in the concept of removal of suspended particulate matter from a body of liquid described in our copending application Ser. No. 851,963, filed Aug. 21, 1969, now Pat. No. 3,693,796. In the aforesaid copending application, an apparatus and method is provided for dividing a moving stream of water or other liquid into an upper strata which carries particulate matter entrained in the stream and a lower strata substantially free of the particulate matter. The present invention represents an improvement over the aforesaid apparatus and method in that it is now possible to introduce a stream of water in an apparatus having an internal liquid passageway using hydraulically created forces to generate an upper strata carrying flotatable material, a lower strata carrying settlable material and an intermediate strata which is relatively free of these particulate materials. In addition, the present invention provides a new means for constructing the apparatus on a relatively simple basis by employing a flow restricting channel conveniently mounted within a housing. This apparatus serves as an intake structure which accomplishes the necessary flow parameters to generate the various strata of water thereby substantially reducing complexities of construction.

The problem of removing suspended material from a body of liquid such as a stream of water in order to use this liquid or otherwise perform further treatment thereon is one which has been receiving widespread attention. This problem has become particularly pronounced in recent years, due in part, to the substantial contamination and pollution of free-flowing rivers and streams with foreign matter. These problems of foreign body removal have been encountered most often by cities and other governmental municipalities, as well as many industries which use the water from these streams and rivers. Generally, the water is diverted through some form of intake mechanism into a treatment plant and subsequently treated.

The problem of diverting moving large bodies of water is also further complicated by the formation of ice particles, particularly in colder climatic regions. When an open body of shallow water such as a river, stream, or lake is subjected to freezing temperatures and the flow is relatively fast, the water loses heat by evaporation to an extent that super-cooling occurs resulting in the formation of small crystals of ice of various shapes and sizes, normally termed "frazil ice." Due to the high flowing velocity of the water, the frazil ice remains in a nearly homogeneous solution because of turbulence, eddy currents and the like, in the main body of water and usually enters intakes as frazil slush. Frazil slush is a concentrated or coherent form of frazil ice. Similarly, other suspended material also tends to enter the intake as homogeneous suspension into which it is formed by turbulence.

The present form of intake mechanism usually relies upon a pipeline or tunnel which is extended from a shore or other land surface and terminating by an intake in the stream. These intakes may have a fixed structure projecting either below or above the water surface. These intakes are also provided with racks to intercept trash, including frazil slush and other particulate material. Some of the intake mechanisms presently employ screens as well as various other physical barriers. However, these physical barriers are not effective in that they become clogged with the particulate matter filtered by the screen or barrier. In order to reduce the clogging of the screen or other physical barrier, many intake designs have employed large mesh screens or other large pore physical barriers. While this is effective in reducing the amount of cleaning time, the larger mesh screen does not filter effectively in the removal of smaller particulate matter such as frazil ice and similar suspended materials.

It is therefore a primary object of the present invention to provide apparatus for separating finely divided particulate matter entrained in a relatively free flowing body of liquid by introducing a portion of the liquid into a liquid passageway under proper hydraulic conditions to create at least one strata which carries a portion of the particulate matter and another strata which is relatively free of the particulate matter.

It is another object of the present invention to provide an apparatus of the type stated which is capable of producing a first strata of liquid containing flotatable particulate matter, a second strata of the liquid containing a settlable particulate matter and a third strata of liquid which is relatively free of these particulate matters.

It is a further object of the present invention to provide an apparatus of the type stated which can be conveniently used in a wide variety of water treatment installations.

It is an additional object of the present invention to provide an apparatus of the type stated which is highly efficient in its operation and which can be constructed at a relatively low cost.

It is also an object of the present invention to provide a method of freeing a flowing liquid from entrained finely divided solids by generating a first strata of the liquid containing a portion of the solids, a second strata of the liquid containing a portion of the solids and a third strata which is relatively free of the finely divided solids.

With the above and other objects in view, our invention resides in the novel features of form, construction, arrangement and combination of parts presently described and pointed out in the claims.

The present invention, therefore, provides a device and a method that is primarily intended to remove trash carried by a moving body of water in the form of ice particles and other suspended material through the use of hydraulically created forces.

In general terms, the device of the present invention can be described as a mechanism for treating a moving body of liquid containing entrained particulate matter. The device comprises a structure having a first pair of spaced-apart walls along with flow restriction means forming a second pair of spaced-apart walls thereby defining a substantially unobstructed internal liquid passageway. The structure is provided with an inlet capable of being at least partially submergible in the body of water and which communicates with the internal passageway. At least one of the first pair of spaced-apart walls have diverging portions increasing the cross-sectional dimension in a plane extending between the two walls forming the first pair of walls. The hydraulics of the system are such that three stratum or layers of the liquid are formed, the first strata carrying flotatable entrained particulate matter, the second strata carrying settlable particulate matter and the third strata located intermediate the first and second strata and being substantially uncontaminated with these particulate matters. The device is provided with first and second spaced-apart discharges communicating with the passageway. In addition, a splitting means is located in the elongated passageway permitting the first strata to flow out of the first discharge and the second strata to flow out of the second discharge. Finally, the device comprises diverting means which are operatively associated with the splitting means to divert at least a portion of the third strata relatively free of the particulate matter.

In more detail, the device described above can be further characterized in that the first strata is an upper strata, the second strata is a lower strata of the liquid and the discharges are vertically spaced apart so that the first discharge is an upper discharge and the second discharge is a lower discharge. The first pair of walls are upper and lower walls and the upper wall has a portion diverging in the vertical direction with respect to the lower wall. The second pair of walls on the flow restricting means are side walls which extend from the lower walls. Further, the diverting means comprises an intake formed in the splitting means and which faces in the direction of movement of the moving body of liquid. The diverting means also includes duct means formed in the structure and communicating with the intake for conducting the intermediate strata away from the first and second strata. In essence, the moving body of liquid creates a pressure differential which is sufficient to drive the intermediate strata into and through the intake means and the duct means while permitting the first and second strata to be discharged from the apparatus. The upper and lower walls are provided with portions diverging in the vertical direction in order to create proper fluid dynamic characteristics within the apparatus.

The structure of the apparatus can be more fully described in that the structure includes a first pair of spaced-apart walls along with flow restricting means forming a second pair of spaced-apart side walls and which together form a substantially unobstructed internal liquid passage. The first pair of spaced-apart walls generally comprises an upper wall and a lower wall and the second pair of spaced-apart walls generally comprise a pair of side walls. The structure is also provided with a discharge and a liquid diverting member which communicates with the substantially unobstructed passage and are located downstream with respect to an inlet also communicating with the passage. Splitting means is located in the passage to divide the moving stream into a moving strata containing entrained solids and a moving strata relatively uncontaminated by said solids. The first of these strata is preferably an upper strata which carries particulate matter and the other strata is preferably relatively free of entrained solids. In addition, the first of these strata moves at a rate which is substantially greater than the other strata and a rate which is also sufficient to carry the entrained solids.

The second pair of side walls have portions which are initially converging in the direction of movement of the stream and that also have diverging portions in the direction of the movement of the stream. The upper wall has a portion which diverges from the lower wall so that the liquid passage has an increasing cross-sectional area in the region of the diverging portion to cause a reduction in the velocity of the upper strata so that the upper strata may pass through the discharge with the floatable particles.

In a preferred embodiment, the lower wall or bottom wall also has a diverging portion in the region of the diverging portion of the upper wall. Furthermore, the upper wall portion diverges upwardly at an angle such that the upper strata flow continues at a reduced velocity. The lower wall portion is located with respect to the upper wall at an angle such that under hydraulic operating conditions, a maximum flow velocity is achieved. In this connection, the diverging portions of the spaced-apart side walls lead substantially toward the splitting means. The side walls on the flow restricting means also have inclined vertical portions.

The method of the present invention can be described in general terms as a method of freeing a flowing liquid from entrained finely divided solids and where the method comprises the introduction of the liquid into and through a restricted passage where the overall velocity of the upper strata of the stream of liquid is decreased. The passage is provided with a ceiling and a floor having portions diverging in the vertical direction and rendering an upper strata of the liquid, a lower strata of the liquid and an intermediate strata of the liquid. Further, the method comprises the causing of the upper strata in the passage to flow slower than the lower strata permitting the upper strata and the lower strata to carry the floatable and settlable entrained matter respectively therewith. In addition, the upper strata, the intermediate strata and the lower strata are split so that the upper strata containing some of the entrained solids is conducted outwardly through an upper outlet communicating with the passage, and the lower strata containing some of the entrained solids is also conducted outwardly through a lower outlet communicating with the passage. Finally, the intermediate strata which is relatively free of these entrained matters is conducted to a site of utilization of this intermediate strata.

The method can be further characterized in more detail in that the upper strata contains floatable entrained solids and the lower strata contains settlable matter. The upper and lower strata are discharged back into the flowing stream of liquid. This flowing liquid is typically water such as in a river or lake.

Figure 1:
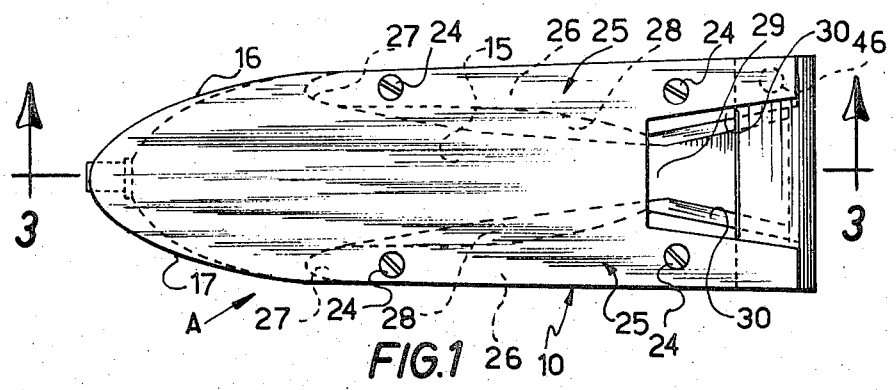
FIG. 1 is a top plan view of an apparatus for treating a moving body of liquid.

Referring now in more detail and by reference characters to the drawings which illustrate a preferred embodiment of the present invention, A designates an apparatus for removal of particulate matter from a moving body of water in the form of an intake structure capable of receiving and taking in a portion of the body of water and for delivery of some of this portion of the water to a receiving source. In this case, the receiving source takes the form of a processing center such as a treatment plant or the like, or the diverted water may be used for industrial or other operations in the state where it is relatively free of particulate matter.

The apparatus A generally comprises an outer housing 10 preferably made from a concrete casting, though other materials such as metals including steel, or other structural materials could be used as well. The housing 10 generally includes a base wall 11 having a pair of upstanding spaced-apart longitudinally extending walls 12 and 13 which are enclosed by a relatively flat top wall 14, thereby forming an internal water receiving chamber or liquid passageway 15. The longitudinally extending walls 12 and 13 are provided with parabolically shaped arcuate portions 16 and 17 respectively, which form an intake aperture or so-called "mouth" 18 communicating with the internal chamber 15. The exact shape or construction of the mouth 18 is not absolutely critical and in many cases, the design of the mouth 18 may be varied in accordance with the condition of water to be captured or other parameters of the physical environment in which the apparatus is to be used.

Figure 2:
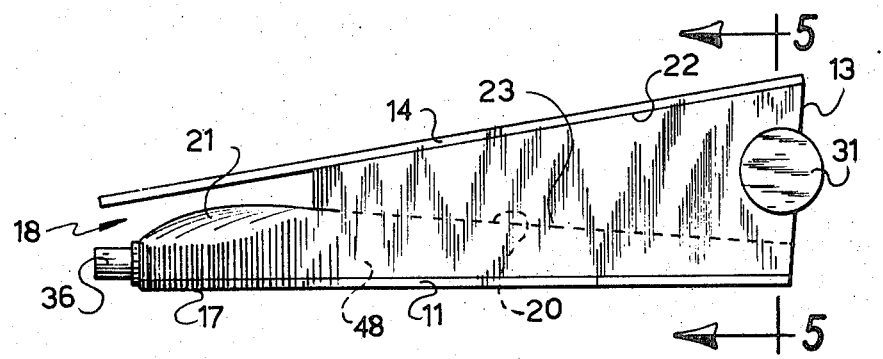
FIG. 2 is a side elevational view of the apparatus of FIG. 1.
Figure 3:
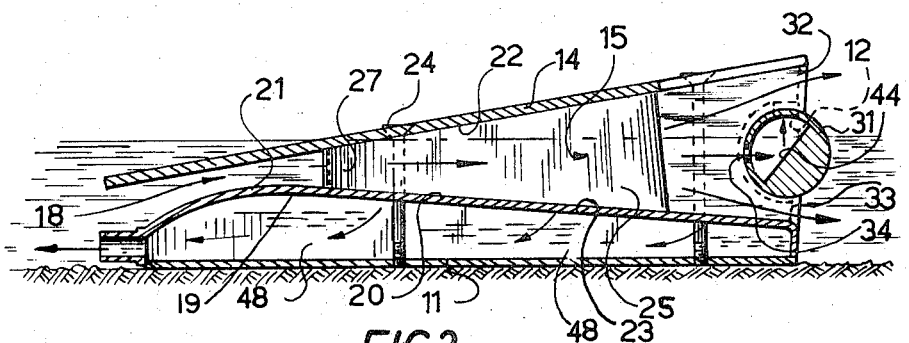
FIG. 3 is a vertical sectional view taken along line 3—3 of FIG. 1.
Figure 4:
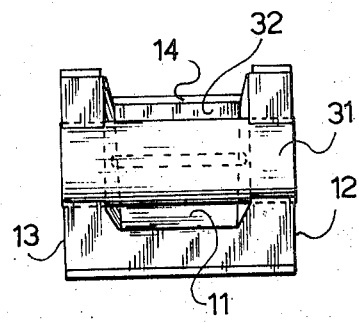
FIG. 4 is an end view of the right-hand end of the apparatus of FIG. 1.

Integrally formed with or rigidly secured to the upper surface of the base wall 11, or otherwise disposed on the upper surface thereof is a base structure 19 which includes an upwardly presented water directing surface or so-called "floor" 20. By reference to FIGS. 2 and 3, it can be observed that the floor 20 includes a slightly arcuately shaped portion 21 which is inclined upwardly in the direction of flow of water through the chamber 15. The cord defining the arcuately shaped portion 21 would generally parallel the plane of the upper wall 14 and it can also be observed that the upper wall 14 has a relatively flat inwardly presented surface or ceiling 22 which is also inclined upwardly in the direction of movement of the water through the chamber 15. The arcuate portion 21 of the floor 20 integrally merges into a relatively flat portion 23 which diverges downwardly so that floor 20 and the top wall 14 have diverging sections in which manner the overall vertical dimension increases toward the discharge end of the apparatus A.

Disposed within the chamber 15 and being rigidly secured to the upper surface of the floor 20 by means of screws 24 or other forms of mechanical fastening elements is a flow restricting member 25. This member 25 may also be cast of concrete and secured to the surface of the floor 20 in the manner as illustrated, or it can be cast as an integral structure along with the housing 10. Furthermore, it is also possible to construct the flow restricting member 25 by casting or machining the same from a suitable metal such as steel or like material. When metals are employed, they should preferably be treated with a corrosion prohibiting material or coating or formed of stainless steel or like material in order to reduce the corrosive effects of the water passing through the channel 15.

The flow restricting member 25 generally comprises a pair of transversely spaced-apart longitudinally extending sections 26 which are substantially identical in their construction and are located in abutting arrangement against the interior surfaces of the longitudinally extending walls 12 and 13, in the manner as illustrated in FIG. 1. These longitudinally extending sections 26 are provided with arcuately shaped forward ends 27 integrally merging into side walls 28 which are tapered so that they converge in the direction of movement of the water, but are spaced apart to provide a central bore 29 forming part of the channel 15. The side walls 28 are also inclined somewhat in the vertical direction so that they taper outwardly as they extend toward the ceiling 22 on the top wall 14. In this way, the water or the stream of liquid which enters the elongated channel 15 through the intake 18 is directed between the side walls 28 and a somewhat confined portion 29 of the passageway 15. The side walls 28 integrally merge into diverging side wall sections 30 which diverge away from each other and toward the respective longitudinally extending walls 12 and 13. The side wall sections 30 are also inclined outwardly and upwardly as seen in FIG. 1. In this connection, it should be noted that while the apparatus is constructed with portions confining the liquid flow through the passageway 15, this passageway 15 is nevertheless substantially unrestricted.

Extending transversely across the open righthand end of the housing 10 is a generally horizontally positioned dividing means, preferably in the form of a cylindrical flow divider 31 and which is also secured to the longitudinal walls 12 and 13. However, while this prefered form of divider is cylindrical in construction, it should be understood that other forms of dividers could be used, including for example a member with tapered walls forming a transversely extending edge which projects into the path of the liquid. The divider 31 is also formed of a proper size and is located approximately midway between the ceiling 22 and the floor 23 near the discharge end of the housing 10 to form an upper discharge 32 and a lower discharge 33.

The flow divider 31 is also formed with an elongated slot 34 extending for at least the greater portion of the axial length thereof and which serves as an intake for a strata of water. The divider 31 includes, in the embodiment shown, a hollow interior forming, in effect, a duct 40 extending to an outlet port 42. In a preferred embodiment, the divider 31 includes a sloping floor 44 which is angled relative to the horizontal plane of the device, in a relationship of at least 45°. The purpose of the sloping floor is to provide an additional means for ensuring that no settlable particles enter into the intermediate strata which is taken off as the liquid to be used; to this end, the inclination of the floor 44 of the divider or diverter should be such that any settlable matter at the upper level of the lower strata, which is introduced into the intermediate strata, will slide back out the inlet slot 34 due to the angle of the floor 44. Preferably, the angle for the floor extends between 45° and 60° with the best results being obtained between 50° to 55°.

Figure 5:
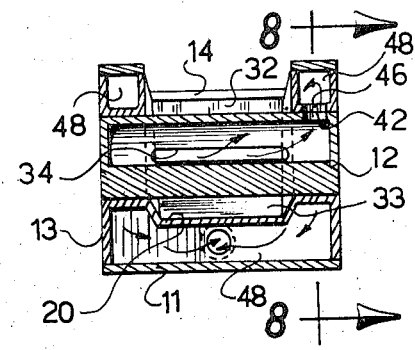
FIG. 5 is a section taken along the line 5—5 of FIG. 2.
Figure 6:
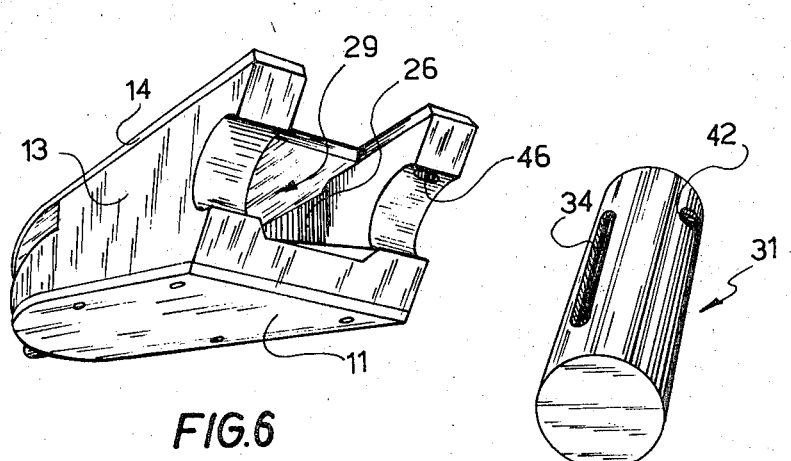
FIG. 6 is a perspective view of the apparatus of FIG. 1.
Figure 7:
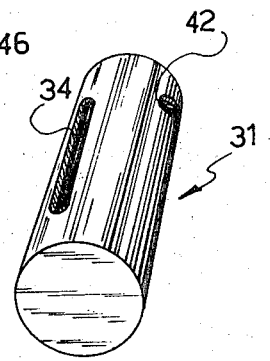
FIG. 7 is a perspective view of the diverter unit of the apparatus of FIG. 6.
Figure 8:
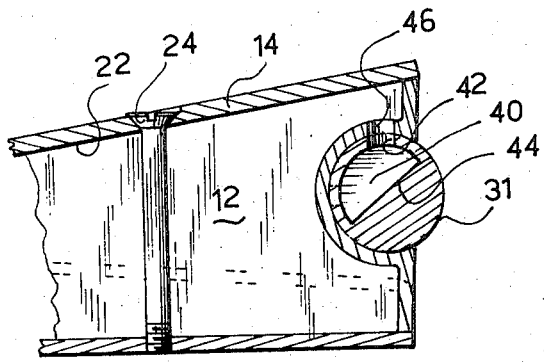
FIG. 8 is a view taken along the line 8—8 of FIG. 5.

Once the liquid passes through the diverter or divider 31 and the outlet port 42, there is provided an inlet aperture 46 at at least one end of the diverter 31 to receive the flow of liquid from the outlet aperture 42 thereof. The aperture 46 is in communication with the hollow space defined between the interior side walls 25 of the device and the exterior side walls 12 and 13 (shown in FIG. 5 in greater detail). The interior apertures or chambers indicated generally by reference numeral 48, extend beneath the floor 20 of the internal passageway 15 (again as shown in FIG. 5) and leads to a discharge outlet 36 which in this case, is at the inlet end 18 of the apparatus. However, discharge outlet 36 can be located at any suitable point; the outlet 36 is connected to a suitable pump (not shown) to withdraw the liquid, which pump is then connected to or directed to a site of utilization such as a processing station. If desired, there may be provided more than one outlet aperture or port 42 for the diverter 31 depending on the flow volumes for any given set of conditions. The pump connected to the outlet port 36 of the internal hollow chamber 48, may be of any suitable capacity for removing the desired amount of liquid for any site of utilization.

In operation, the water from the moving body, along with frazil slush or any other entrained material flows through the mouth 18 into the elongated chamber 15. The flow rate of this water is dependent to a large extent on the amount of discharged water passing through the discharges 32 and 33 and the amount of water diverted through the diverting duct work 35 and 36, as well as the condition of the water. With frazil ice entrained in the water, the flow rate at the inlet is approximately 2 feet per second. The configuration of the passage is such that it has a floor and a roof which diverge so as to increase the cross-sectional area and initially decrease the flow velocity. The floor diversion angle is such that under a hydraulic operating condition maximum velocity is obtained, which is again dependent upon the material quantities to be removed. The diversion angle of the roof is also related to hydraulic requirements to the extent to form and maintain a reduced velocity field of the upper strata, such that the upper portion of the flow continues at a reduced velocity, and flows through the upper discharge. By virtue of the configuration of the lower structure of the apparatus of the present invention, the flow velocity of the lower strata is maintained at a substantially continuous or higher velocity to that of the liquid entering the device or more preferably, at an increased velocity field compared to the velocity of the liquid inflow and compared to the velocity of the upper strata. The flow velocity through the entire apparatus is induced by virtue of the Venturi effect of the flowing stream of water passing downstream behind and at each side of the structure. Alternately, in the case of a dam, the Venturi effect arises by the flow of the excess water caused by the pull of gravity.

As the water enters the elongated chamber 15, the velocity profile will be relatively constant since the arcuate portion of the wall 21 generally parallels the ceiling 22 at this point within the substantially unobstructed channel 15. However, shortly thereafter the velocity profile of the liquid changes substantially due to the diverging portion 23 of the floor 20 and the diverging portion of the ceiling 22. Furthermore, the flow velocity profile is substantially altered since the liquid then passes through the reduced portion 29 of the channel 15. In this manner, the liquid passing through the chamber 15 will tend to form an upper strata in the region of the ceiling 22 which travels at a slower rate as the water entering through the intake 18. It can be observed that the flow velocity is not impeded to any material extent since the water can travel at an almost straight-line path from the inlet 18 through the discharge 32. A second strata of water is formed and which will travel near the region of the floor 23 and out through the lower discharge 33. However, under the hydraulic operating conditions, the velocity of this strata is substantially faster than the velocity of the upper strata. The hydraulic operating conditions within the apparatus also permit the formation of an intermediate strata which moves at a velocity somewhat intermediate to the velocity of the upper and the lower strata. In this way, the upper strata of liquid will carry the floatable material such as frazil ice and the like, out through the discharge 32 and the lower strata will carry the potentially settlable material out through the lower discharge 33 and back into the stream or the body of water.

The intermediate strata or center strata will be diverted through the intake 34 and through the diverting duct work 35 to a site of utilization. Since the intermediate strata flows at a velocity which is insufficient to carry floatable material (which is taken off by the slower moving upper strata), while the velocity of the lower strata is sufficient to entrain and take off the settlable material (by virtue of the fact that the velocity of the lower strata is at least equal to that of the velocity of the liquid entering the device and preferably greater than such velocity), this intermediate strata will remain relatively free of particulate matter which is floatable and taken off by the slower moving upper strata and the settlable matter which is taken off through the faster moving lower strata.

Thus, the speed of water flow in the upper strata is at least slow enough to permit the entrained material to be buoyant in this strata and thus the buoyant solids will be carried out with the slower moving water leaving the discharge 32. The faster moving stream or lower strata has a flow rate which is at least sufficient to carry the other settlable solids out through the lower discharge 33. Any settlable material which is not carried by the lower strata may tend to precipitate to the floor. However, since the floor slopes downwardly toward the lower outlet or discharge 33, the precipitated solids will be urged or pushed toward and out through the discharge 33 by the moving stream of water, as well as any settlable material which entered the inlet aperture 34 of the diverter or divider 31 and which slides back out by virtue of the angle of inclination of the floor 44 thereof. Thus, water or other liquid which enters the inlet apertures 34 is passed through the outlet port 42 into the aligned mating outlet port 46 of the inner chamber 48 of the device, and from the inner chamber 48 to the discharge outlet 36.

The overall size of the intake apparatus may vary considerably depending on the type of installation in which the apparatus is to be used. However, in many cases the size of the mouth or intake 18 may be as much as 50 feet or more in transverse dimension and may have a height of twelve or more feet as well. The distance between the intake 18 and the splitter 31 may also be as much as 100 feet or more. It is also possible to use air injection as an optional feature in order to assist in the floatation of the particulate matter in the upper strata of liquids.

The apparatus of the present invention is also highly effective as an ice floatation device operating without mechanically movable components. The upper part of the entrance or intake 18 should be located or situated at a point about 10 feet or more below water level so that floating icicles, breaking drift ice and a part of the snow slush and compact flakes of frazil are pushed to one side of the surface in front of the entrance thereof.

It will be understood that various modifications can be made to the device, which are contemplated by the present invention. Thus, for example, the inlet of the apparatus of the present invention defined by the aperture between the roof or ceiling 14 and the portion 21, which in the drawings is shown as being an opening in the flow direction of the stream, may be located at the sides of the device (one or both), depending on the conditions which are encountered in the stream of liquid, to prevent entry of large particulate matter or other undesirable matter. By locating the opening or inlet for the device at the sides, the major portion of the material may be diverted by the closed front configuration of the apparatus. Still further, in the arrangement illustrated, the inlet aperture may be provided with suitable screens to likewise eliminate undesired foreign matter.

In a further embodiment, and where the device is used to separate frazil ice from liquid, the floor 21, or at a point advanced or slightly removed downstream from, may be provided with suitable heating coils to elevate the temperature of the water. Such heating devices are well-known and may be inserted in the floor and/or the side walls and/or the ceiling of the apparatus. Still further, in place of using heating coils to prevent frazil ice build-up on the walls of the apparatus, the walls and/or ceiling and/or floor may be coated with suitable material, such as that marketed under the trade mark "TEFLON" or the like for preventing the frazil ice particles from adhering to the structure.

In the case of the diverter, as illustrated in the drawings, the housing 10 includes an end configuration adapted to receive the divider 31 and to permit the same to be removed for inspection and/or repairs if required. However, this may be a permanent of the device, depending on the size of the same, and suitable access ports may be provided to permit inspection and/or repairs to the same. Thus, the divider 31 need not be removable as such. Obviously, also, in the case of large size installations or medium size, as outlined above, the entire unit may be prefabricated from suitable components or casts using cementitious material whereby fastening means such as screws 24 and the like will not be included but rather, the components which the screws 24 fasten together may be integral components of the members to which they are attached.

Thus there has been shown and described a novel apparatus for removal of particulate matter from a moving body of liquid and which fulfills all of the objects and advantages sought therefor. It should also be observed that changes and modifications in the structure and arrangement, and combination of parts presently described and pointed out can be made without departing from the nature and principle of our invention and therefore all such changes and modifications are covered by our invention which is deemed to be limited only by the following claims.

We claim:

1. An installation for freeing a moving body of liquid from finely divided solids entrained therein, said installation comprising a structure located in the bed of a flowing stream of liquid and provided with an elongated passage extending in a generally horizontal downstream direction, said structure being comprised of a ceiling and a floor and side walls to define said passage, said structure being provided with an entrance at one end of the elongated passage submerged in and receiving a part of the stream of liquid and at the other end thereof with vertically spaced-apart upper and lower outlets permitting discharge of at least a portion of said part of the stream of liquid, the upper and lower outlets leading back to the stream of liquid, and an intermediate outlet leading to a site of utilization of the liquid, said ceiling sloping upwards from the inlet to the upper outlet so that at least a portion of the elongated passage has an increasing cross-sectional area toward the outlets thus forming a moving upper strata having a reduced velocity carrying at least some of the floatable solids and a moving lower strata with an increased velocity of the liquid carrying at least some of the settlable solids and an intermediate strata extending between said upper and lower strata relatively free of said solids, splitting means located in said elongated passage and projecting upstream to divide the upper and lower strata and the intermediate strata so that the upper strata is caused to flow out of said upper outlet and the lower strata is caused to flow out of said lower outlet, whereby entrained solids are passed out with the liquid in the upper strata and lower strata leaving the upper and lower outlets, and means to divert and conduct the intermediate strata away from the upper strata and lower strata, and to a site of utilization.

2. A device for treating a moving body of liquid containing entrained particulate matter, said device comprising a structure having a first pair of spaced-apart walls, means forming a second pair of spaced-apart walls and which together form a substantially unrestricted internal liquid passageway, said structure having an inlet capable of being at least partially submergible in said body of water and communicating with said passageway, at least one of said first pair of spaced-apart walls having a diverging portion increasing the cross-sectional dimension in a plane extending between said first pair of walls thereby forming a first strata carrying floatable entrained particulate matter, a second strata carrying settlable particulate matter and a third strata relatively free of particulate matter located intermediate said first and second strata, first and second spaced-apart discharges communicating with said passageway, splitting means located in said elongated passageway permitting the first strata to flow out of said first discharge and said second strata to flow out of said second discharge, and diverting means operatively associated with said splitting means to divert at least a portion of said third strata, said diverting means comprising an intake formed in said splitting means and facing the direction of movement of said moving body of liquid.

3. The device of claim 2 further characterized in that said diverting means comprises an intake formed in said splitting means and facing the direction of movement of said moving body of liquid, and duct means formed in said structure and communicating with said intake for conducting said intermediate strata away from said first and second strata.

4. A device for treating a moving body of liquid containing entrained particulate matter, said device comprising a structure having a first pair of spaced-apart side walls and means forming a second pair of spaced-apart walls and which together form a substantially unobstructed internal liquid passage, said structure having an inlet communicating with said passage and capable of being at least partially submergible into said moving body of liquid and leading downstream into said internal liquid passage to substantially fill said passage with a moving stream of the solid entrained liquid from said body, said structure having a discharge and a diverting liquid receiving member communicating with said substantially unobstructed passage and located downstream with respect to said inlet, splitting means located in said liquid passage to divide the moving stream of liquid into a moving first strata carrying floatable solids and a second strata, said second strata being moving and having settlable solids associated therewith, and a third strata uncontaminated with these solids, said second strata moving at a rate substantially greater than said first strata and at a rate sufficient to carry said settlable entrained solids, said second pair of walls having portions initially converging in the direction of movement of the stream and diverging portions in the direction of movement of the stream, at least one wall of said first pair of walls having a portion diverging from the other of said walls so that said liquid passage has an increasing cross-sectional area in the region of the diverging portions of the one pair of walls to cause a reduction in the velocity of the solid uncontaminated strata so that the uncontaminated strata may pass through said diverting liquid receiving member substantially free of said finely divided solids and to maintain at least a continuous velocity in the settlable solids entrained strata so that the settlable solids entrained strata will pass through said discharge carrying a substantial portion of said finely divided settlable solids outwardly from discharge.

5. The apparatus of claim 4 further characterized in that both of said first pair of walls have diverging portions.

6. The apparatus of claim 5 further characterized in that the diverging portions of the spaced-apart side walls lead substantially toward said means.

7. The apparatus of claim 5 further characterized in that said side walls have inclined vertical portions.

8. The apparatus of claim 4 further characterized in that said first pair of walls are upper and lower walls and said second pair of walls are side walls extending from said lower walls, and that said floatable material strata is an upper strata and said uncontaminated strata is located beneath said upper strata.

9. The device of claim 8 further characterized in that both of said upper and lower walls have portions diverging in the vertical direction.

10. The apparatus of claim 9 further characterized in that the upper wall portion diverges upwardly at an angle such that the upper strata flow continues at a reduced velocity.

11. The apparatus of claim 10 further characterized in that the lower wall portion is located with respect to said upper wall at an angle such that under hydraulic operating conditions an increased flow velocity is achieved.

12. The apparatus of claim 4 further characterized in that the finely divided settlable solids are frazil ice and the stream of liquid is water.

* * * * *